(12) United States Patent
Peng

(10) Patent No.: US 8,184,419 B2
(45) Date of Patent: May 22, 2012

(54) POWER SUPPLY WITH CURRENT LIMITING CIRCUITS

(75) Inventor: Chung-Hang Peng, Walnut, CA (US)

(73) Assignee: LHV Power, Corp, Santee, CA (US)

( * ) Notice: Subject to any disclaimer, the term of this patent is extended or adjusted under 35 U.S.C. 154(b) by 816 days.

(21) Appl. No.: 12/067,713

(22) PCT Filed: Sep. 26, 2006

(86) PCT No.: PCT/US2006/037779
§ 371 (c)(1),
(2), (4) Date: Mar. 21, 2008

(87) PCT Pub. No.: WO2007/038649
PCT Pub. Date: Apr. 5, 2007

(65) Prior Publication Data
US 2008/0253155 A1    Oct. 16, 2008

(51) Int. Cl.
*H02H 9/08* (2006.01)
*H02H 9/00* (2006.01)
*H02H 3/00* (2006.01)

(52) U.S. Cl. ............. 361/93.9; 361/18; 361/94; 361/95; 361/96

(58) Field of Classification Search .............. 361/94–96, 361/18, 93.9
See application file for complete search history.

(56) References Cited

U.S. PATENT DOCUMENTS

| | | | |
|---|---|---|---|
| 4,024,437 A * | 5/1977 | Suzuki | 361/87 |
| 6,574,081 B1 * | 6/2003 | Matsumoto et al. | 361/18 |
| 6,650,070 B1 * | 11/2003 | Hudson et al. | 315/312 |
| 7,218,496 B2 * | 5/2007 | Kitagawa | 361/93.9 |
| 2005/0243580 A1 * | 11/2005 | Lyle, Jr. | 363/16 |

* cited by examiner

*Primary Examiner* — Jared Fureman
*Assistant Examiner* — Scott Bauer

(57) ABSTRACT

A power supply (200) is provided having a plurality of independent current limiting circuits. A first current limiting circuit (6) provides protection against a short circuit or other extraneous load conditions, while a second current limiting circuit, using a trace on a PCB as a sensing element, is programmable on the basis of a time constant and a current level.

3 Claims, 1 Drawing Sheet

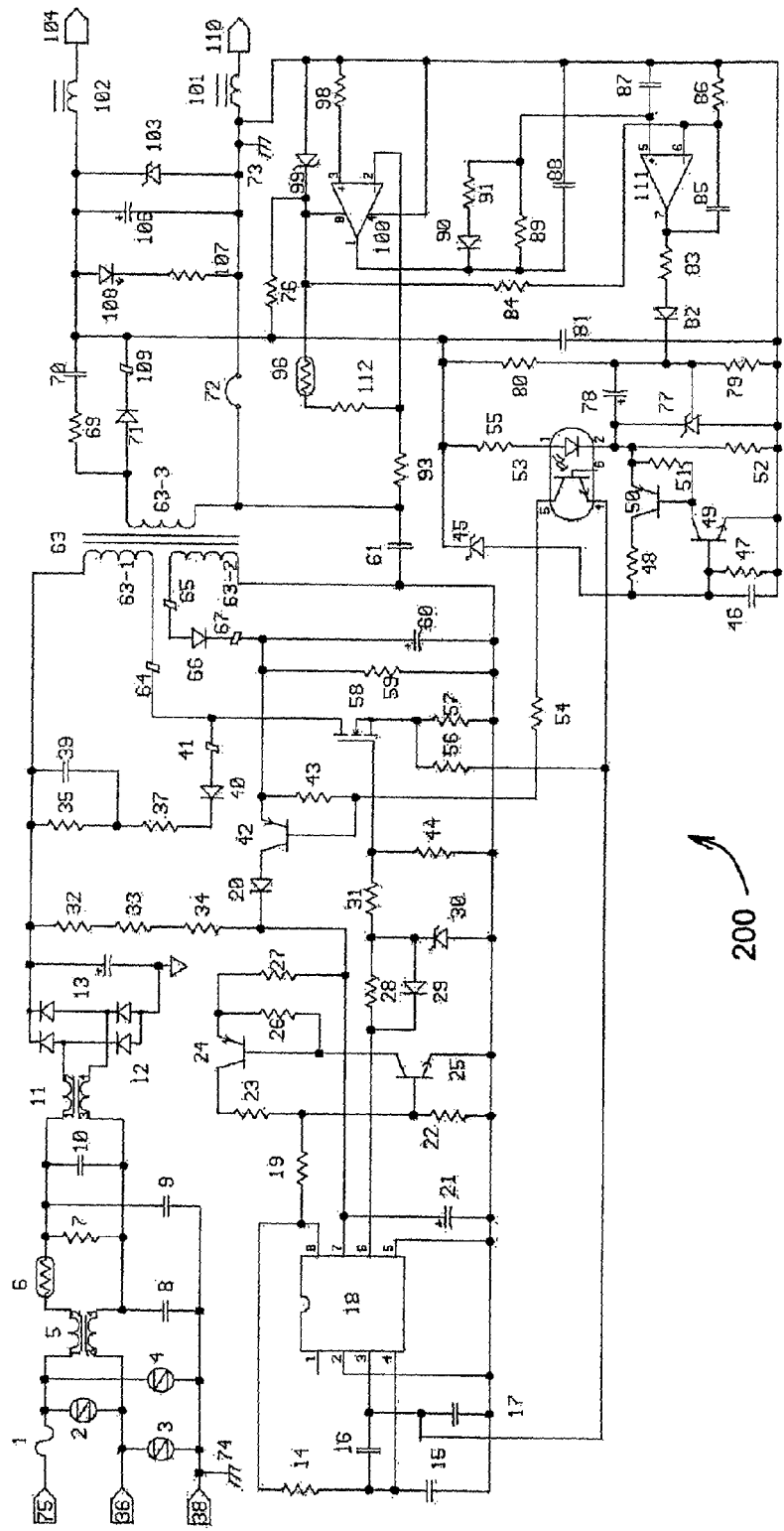

POWER SUPPLY WITH CURRENT LIMITING CIRCUITS

BACKGROUND OF THE INVENTION

1. Field of the Invention

The present invention relates to a power supply having a power limit of less than 100 VA, yet still capable of supplying for a short duration an instantaneous load demand that is larger than its power limit.

2. Description of Related Art

Power supplies are available as off-the-shelf electronic components meeting the "Limited Power Source" requirement of applicable UL specifications, more particularly, of UL 1950, aimed at eliminating the possibility of the power supply causing hazardous fires when overloaded or malfunctioning. "Limited power" is generally defined as power not exceeding 100 VA.

To meet such specifications, "fuses" have been employed in the prior art that blow open when the load element exceeds 100 VA. This technology is however undesirable, because a fuse needs to be replaced every time a fault occurs, and because the fuse reaction time to an overload condition is relatively long, possibly causing unwanted damage to the equipment to which the power supply is supplying power.

Another type of power supply in the prior art that meets the "Limited Power Source" requirement uses an internal electronic current limiting the total power output so that it never exceed 100 VA. This technology provides operating disadvantages, because some types of electronic equipment demand a high momentary current of a relative short duration, with a peak power demand as high as 400-500 VA, while the average power demand in a longer time span is always less than 100 VA. This causes this type of power supply, rated less than 100 VA, useless for such applications.

Further, while UL 1950 requires a reaction time of 30 seconds, a revision of UL 1950 presently under review will decrease the reaction time to five seconds.

BRIEF SUMMARY OF THE INVENTION

It is an advantage of the present invention to provide to a power supply with current limiting circuits that can supply a load with an average power demand that is substantially less than 100 VA, but with pulse power demand that is substantially higher than 100 VA.

It is another advantage of the present invention to provide a power supply with current limiting circuits wherein the reaction time to a pulse power demand can be set to predetermined limits.

Briefly, a power supply is provided having a plurality of independent current limiting circuits. A first current limiting circuit provides protection against a short circuit or other extraneous load conditions, while a second current limiting circuit, using a trace link on the printed wiring board as a sensing element, is programmable on the basis of a time constant and a current limit level. As a result, the power supply can provide high pulse current demand from the load and can at the same time limit the power output from the power supply, complying, on an average basis, with the "Limited Power Source" requirement imposed by applicable regulations.

The power supply design according to one embodiment of the present invention comprises two electronic power limit circuits, each having a deferent limit level and time delay. Such a power supply is capable of supplying power at a predetermined peak level that is substantially higher than 100 VA and that has a predetermined duration from zero seconds to five seconds. At the same time, the power supply is prevented from supplying power in the event that the drawn load is more than 100 VA for more than five seconds.

In one variant of this embodiment, the power supply can either latch-off or automatically restart if the over power condition is reached. In the latch-off mode, the input power must be removed and re-applied, in order to cause the power supply to restart.

BRIEF DESCRIPTION OF THE SEVERAL VIEWS OF THE DRAWINGS

The enclosed FIG. 1 constitutes a part of this specification and includes an exemplary embodiment of the invention, which may be embodied in various forms.

More specifically, FIG. 1 is a diagrammatic view of one embodiment of the power supply with current limiting circuits.

DETAILED DESCRIPTION OF THE INVENTION

A detailed description of an embodiment of the invention is provided herein. It is to be understood, however, that the present invention may be embodied in various forms. Therefore, the specific details disclosed herein are not to be interpreted as limiting, but rather as a representative basis for teaching one skilled in the art how to employ the present invention in virtually any detailed system, structure, or manner.

Turning to FIG. 1, there is shown an embodiment 200 of a power supply with current limiting circuits. An AC-DC converter circuit inputs a 90 V to 264 V AC voltage into connections 75 and 36, charging bulk capacitor 13 and establishing a DC voltage of 120 V DC-370 V DC across bulk capacitor 13, according to the AC input voltage. Such high voltage carries through voltage dropping resistors 32, 33, and 34, thereby charging capacitor 21 with a voltage up to 16 V. Pulse Width Modulator (PWM) control 18 becomes then active and begins producing a pulse width modulated gate drive to MOSFET (metal-oxide field-effect transistor) 58, causing energy to be stored into transformer 63 and be released to output capacitor 106, while at the same time charging storage capacitor 60.

While these events occur, the voltage at pin 8 of PWM control 18 rises to 5 V, providing current through resistor 19 that turns transistor 25 to an active state, which causes transistor 24 to become active and transistors 24 and 25 to become in a latching-on state, thereby connecting resistor 27 to capacitor 21. The values of resistors 27 and 23 are carefully chosen, so that resistors 32, 33, and 34 are prevented from supplying sufficient current to maintain a 10 V voltage across resistors 27 and 23, while transistors 24 and 25 remain in the latching-on state.

The DC voltage that supports PWM control 18 in operation is generated by main transformer 63, for which the voltage of winding 63-2 is rectified by diode 66 and filtered by capacitor 60. Such a voltage is connected, by transistor 42 and diode 20, to PWM control 18.

When the output voltage is regulated to reach a predetermined value, shunt-regulator 77 will conduct current through options-coupler 53. With a primary photo diode, this current will be coupled to its secondary photo transistor and the current flow in this transistor will provide the base current for transistor 42, keeping it in fully turn-on condition.

A first current limiting function is accomplished by sensing the voltage drop across resistor 57. When PWM control 18 provides gate drive voltage to MOSFET 58, the current level will ramp up into resistor 57, and this current will develop voltage on resistor 57. This sensed voltage is then fed to pin 3 of PWM control 18, and when this voltage level reaches a predetermined level set by PWM control 18, then PWM control 18 will turn off the gate drive to MOSFET 58 and stop the current flow. Such an action will limit the energy transfer process of the power supply, and, therefore, the output voltage will drop below the regulated voltage setting, shunt-regulator 77 will no longer conduct current, and the base current for transistor 42 will cease, causing transistor 42 to turn-off. Consequently, PWM control 18 will not receive a voltage high enough to operate, and the power supply will no longer provide power to the output, remaining in such a latch-off condition indefinitely. This will complete the current limiting function of the power supply.

This current limiting level is designed to be set high enough to ensure proper output voltage during a short high current pulse condition demanded by the load. To reset this latching condition, the AC input voltage must be turned off for an adequate time, and re-applied to enable the power supply to start and operate continuously again. This turn-off and latch-off function is of relevance, in order to provide proper protection of the power supply and load combination and to prevent a fire hazard.

A second current limiting circuit is in the secondary side of the power supply circuit. Resistor 76 and zener diode 99 provide a regulated voltage that enables operational amplifiers (OP) 100 and 111 to operate. As shown, OP 100 derives its reference voltage from the thermistor 96, resistor 112 and resistor 93 voltage divider network.

Such a voltage is compared with the voltage sensed from printed circuit board (PCB) copper trace link 72, wherein trace link 72 is formed by a PCB trace that has only a few milliohm resistance. Using a PCB trace link as current sensing element is important, because this will prevent the circuit from generating any more unwanted heat due to the extra voltage drop across the resistive sensing element. A PCB trace link is also inherently more reliable than having one more component.

Further, PCB copper traces have a positive temperature coefficient, which can increase the voltage drop across it at a higher temperature, making the current sensing threshold drift with temperature. To eliminate such a temperature drift effect, a negative temperature coefficient thermistor 96 is inserted in the voltage reference divider network. By choosing the thermistor 96 value carefully, the temperature drift problem can be substantially removed.

The output load current develops a voltage drop across PCB trace link 72, creating a negative voltage drop on the left hand side of link 72, and adding to the positive voltage set-up on resistor 93, which is eventually fed to OP 100's negative input port. In the presence of an output over-current condition, the magnitude of the negative voltage across link 72 is high enough to offset the positive voltage across resistor 93, and the input voltage to OP 100's negative input will be negative. This forces the output of OP 100 to be high, with OP 100 working as a comparator. Current is then caused to flow through resistor 89, charging capacitor 87.

If the time of an output over-current condition is long enough, the voltage developed on capacitor 87 will rise high enough that its voltage level will go beyond the voltage levels set by resistor 84 and resistor 86 voltage divider networks. This will change the output state of OP 111 from low to high, with resistor 84 and capacitor 87 determining the time constant of the delay functions.

The direction of diode 90 and the value of resistor 91 can provide for a different behavior of the time delay circuit when the time delay circuit reacts to a different output over-current condition.

When the output of OP 111 increases to a high level, current travels through resistor 83 and diode 82, forcing shunt regulator 77 into full shunt mode and further forcing current to flow though the primary light emitting diode (LED) of an OPTO-coupler 53. Secondary transistor of 53 will then turn on fully. Such an action will command PWM control 18 to stop the gate drive duty cycle to MOSFET 58 and, with MOSFET 58 not switching, both the output voltage, as well as the voltage on capacitor 60, will drop. When voltage of capacitor 60 drops below about 12V, PWM control 18 shuts down, preventing any more gate drive voltage to MOSFET 58. The power supply then initiates a shut down sequence and ends up in a latch-off condition. Subsequently, the only way to restart the power supply is to reset the AC input voltage as described before.

When transistor 24 is not installed, transistor 25 cannot remain in a latched on state. Once the PWM control 18 shuts down, no more base drive is supplied to transistor 25. In this situation, the only current drain to capacitor 21 is only the about two hundred microamperes of current that PWM control 18 is drawing. Therefore, a start sequence as described above will initiate, and the power supply will start and try regulating again. If the over-current condition persists, the same shutdown sequence will commence again and repeat itself. This is a circuit option enabling the power supply to have an automatic restarting capability.

While the invention has been described in connection with the above described embodiments, it is not intended to limit the scope of the invention to the particular forms set forth, but on the contrary, it is intended to cover such alternatives, modifications, and equivalents as may be included within the scope of the invention.

INDUSTRIAL APPLICABILITY

The present invention has industrial application in circuits within information technology equipment where it is important or essential to meet or exceed the UL 1950 requirements of a limited current circuit, and to comply with the limited power source safety requirements wherein a limited power source shall incorporate an isolating transformer as per UL 1950, section 2.11.

What is claimed is:

1. A method for a current limiting function in a power supply, comprising;
   providing a first current limiting circuit which comprises:
      a resistor, a PWM control, a MOSFET, a shunt regulator, and a first transistor and further comprising,
   providing a second current limiting circuit on the secondary side of a transformer, located within the power supply,
   using a PCB copper trace as a current sensing element,
   further comprising the steps of:
      (a) providing a resistor, a zener diode, and operational amplifiers;
      (b) sensing a voltage from said PCB copper trace;
      (c) comparing said voltage sensed with voltage developed from said zener diode;
      (d) providing a second shunt regulator and an opto-coupler comprising a primary LED and a secondary transistor; and
      (e) causing the power supply to initiate a shut down sequence when the output of said operational amplifiers increases to a high level thereby causing said secondary transistor to turn on fully and forcing current flow through said opto-coupler causing said PWM control to stop the gate drive to said MOSFET resulting in the shut down of the power supply to a latch-off condition.

2. The method for current limiting function in a power supply, according to claim 1, further comprising the steps of:
(a) providing a temperature coefficient thermistor and a voltage reference divider network;
(b) inserting said temperature coefficient thermistor within said voltage reference divider network, Wherein said thermistor eliminates any temperature drift associated with using said PCB copper trace as a current sensing element having a positive temperature coefficient.

3. The method for current limiting function in a power supply according to claim 1, further comprising a second transistor and third transistor and a capacitor, wherein when said first transistor is operative, said second transistor cannot remain in a latched on state, whereby the current drain to said capacitor is only approximately 200 microamperes as drawn from said PWM control, thereby initiating a start sequence, wherein the power supply will start up and regulate again.

* * * * *